(No Model.)
I. A. & W. L. COCHRAN.
BRAKE FOR BICYCLES AND SIMILAR VEHICLES.
No. 510,407. Patented Dec. 12, 1893.
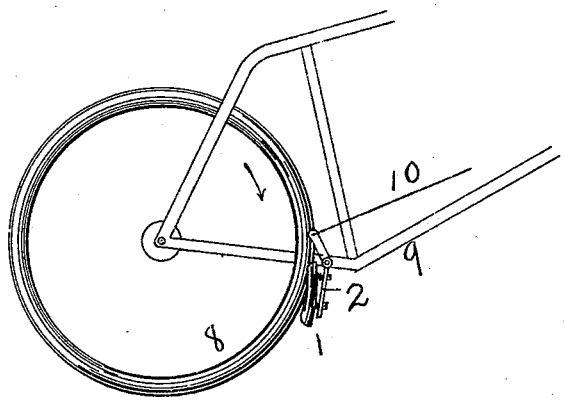
Fig. 1.
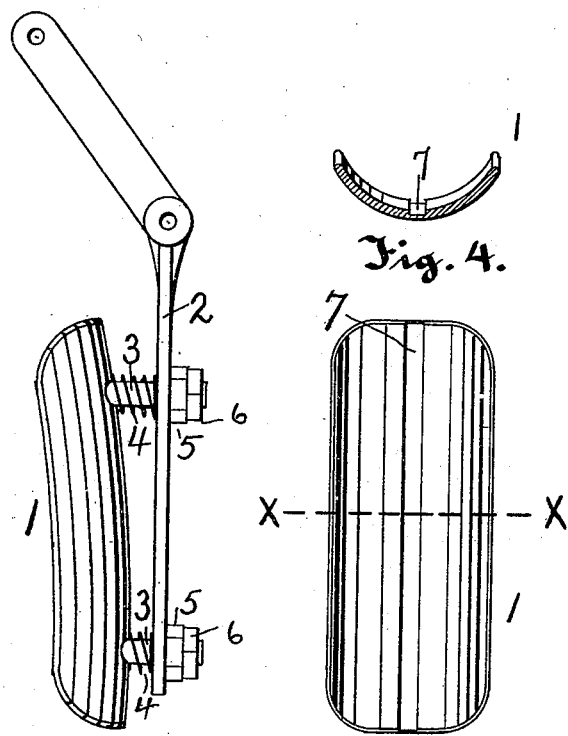
Fig. 2.    Fig. 3.
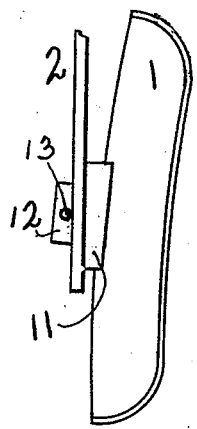
Fig. 4.
Fig. 5.
Witnesses.
Frank B Howe.
Allyn S. Kellogg.
Inventors.
Isaac A. Cochran,
William L. Cochran.
by Howe + Kellogg
attys.

UNITED STATES PATENT OFFICE.

ISAAC A. COCHRAN AND WILLIAM L. COCHRAN, OF MELROSE, MASSACHUSETTS.

BRAKE FOR BICYCLES AND SIMILAR VEHICLES.

SPECIFICATION forming part of Letters Patent No. 510,407, dated December 12, 1893.

Application filed September 1, 1892. Serial No. 444,749. (No model.)

*To all whom it may concern:*

Be it known that we, ISAAC A. COCHRAN and WILLIAM L. COCHRAN, citizens of the United States, residing in Melrose, in the county of Middlesex and State of Massachusetts, have invented certain new and useful Improvements in Brakes for Bicycles and Similar Vehicles, of which the following, taken in connection with the accompanying drawings, is a specification.

Our invention relates to improvements in brakes for bicycles and kindred machines, and particularly to that class in which the wheels are provided with pneumatic tires; and the object of our invention is to provide a better and more effective brake than any now in use; a brake that will yield readily to slight irregularities in the tire or wheel; that will be less liable to injure the tire, and one in which mud will be less liable to collect, and from which any mud that does collect in the brake shoe may be more readily cleaned by the action of the wheel. We accomplish these objects by the device shown in the accompanying drawings, in which—

Figure 1 is a side view of the rear wheel and a part of the frame of a bicycle, showing our device in position. Fig. 2 is a side view of our device. Fig. 3 is a front view of the brake shoe. Fig. 4 is a sectional view of the brake shoe, on the line X, X, Fig. 3. Fig. 5 is a side view, showing another manner of attaching the brake shoe to the brake lever.

Like numbers of reference refer to like parts in all the figures.

Referring to the drawings, 1 is the brake shoe, which may be either cast, stamped or forged from metal, or otherwise made of any suitable material, and which is concaved on its inner surface, to substantially conform to the shape of the tire of a bicycle wheel, and which has a slight groove, 7, extending longitudinally in the center of its concave surface said groove being somewhat larger than the ridge of rubber that is left on the periphery of the tire by the mold in which the tire is vulcanized, and which is commonly called the "mold mark," thus affording sufficient space to receive said mold mark when the brake is applied, and preventing said mold mark from being worn or torn by the friction of the brake to which it would otherwise be subjected, and which is a great injury to the tire.

Projecting from near each end of the back of the brake shoe, are two bosses, 3, 3, which are threaded at the ends to receive the nuts 5, 5, which secure the brake shoe to the brake lever, 2, and said bosses also have around them spiral springs, 4, 4, which allow the brake shoe to yield slightly to any irregularities in the tire or wheel. As will be seen in the drawings, the upper spring is longer than the lower one. This is to cause the upper or rear end of the brake shoe, that is, that end which is rearmost with respect to the forward motion of the wheel, to come in contact with the tire first so that this end will act as a scraper. This construction will prevent the collection of mud or other substances between the brake shoe and tire, thus avoiding to a great degree the wedging in of particles of mud or other hard substances between the shoe and tire, an incident that greatly injures and rapidly wears out the tire.

The brake shoe is secured in proper position on the brake lever by the nuts 5, 5, and these nuts are prevented from becoming disarranged by the lock nuts 6, 6.

8 is a wheel, and 9 a part of the frame of a bicycle, and 10 the brake rod connecting the brake lever 2, with the brake handle which is not shown, as it is a well known arrangement.

In Fig. 5 is shown another form in which we can make our device, and which, in some cases, may be preferable. Instead of two bosses, one near each end of the back of the brake shoe, we may use one boss, 12, at the center of the back, and in this case, the boss will be made square or oblong in cross section, to prevent the brake shoe from turning in the brake lever. Surrounding this boss, between the brake shoe and the brake lever, is an elastic rubber washer 11, said washer being wedge shaped, and having its thicker end toward the top of the brake shoe, by which means the top of the brake shoe will be thrown nearer the wheel than the bottom, thereby accomplishing the same results as attained by the use of the springs heretofore described. 13 is a pin inserted through a hole in the boss 12, to keep the brake shoe in position on the brake lever 2.

The operation of the embodiment of our invention shown is as follows:—When the brake is applied, the brake rod 10 acting on the brake lever 2 will press the rear or upper inner edge of the brake shoe 1 against the tire of the wheel 8. This end of the brake shoe coming in contact with the tire first will be forced back against the upper spring until the whole surface of the brake shoe is in contact with the tire, when the full effect of the brake will be realized. The brake shoe being wholly yieldingly connected to the brake lever, allows said brake shoe to conform to any irregularities in the tire or wheel, and, while exerting a very strong and effective pressure on the tire, is not liable to injure the same, as is the case where a rigid brake is used.

Having thus described our invention and the operation thereof, what we claim as new, and desire to secure by Letters Patent of the United States, is—

1. In a brake, the beam or head 2, the shoe having its rear end (*i. e.* the end rearmost with respect to the forward motion of the wheel) constructed to act as a scraper, a supporting rod or rods 3 3 yieldingly secured to the beam, and a spring or springs 4 4 interposed between the shoe and the head adapted to hold the rear end farthest from the beam so that the said end may come in contact with the wheel before the remaining frictional surface of the shoe and that the shoe may have a yielding connection with the brake head, substantially as described.

2. In a brake, the shoe having its frictional surface provided with a groove 7 arranged in the plane of the wheel and adapted to receive and protect the mold mark on the tire, substantially as described.

In testimony whereof we have hereunto subscribed our names this 30th day of August, A. D. 1892.

ISAAC A. COCHRAN.
WM. L. COCHRAN.

Witnesses:
D. W. ALLEN,
CHAS. A. KELLOGG.